(12) United States Patent
Bonn

(10) Patent No.: US 7,137,651 B2
(45) Date of Patent: Nov. 21, 2006

(54) FLUID PIPING SYSTEMS AND PIPE SPOOLS SUITABLE FOR SUB SEA USE

(75) Inventor: John W. Bonn, Hilliard, OH (US)

(73) Assignee: Chart Industries, Inc., The Woodlands, TX (US)

( * ) Notice: Subject to any disclaimer, the term of this patent is extended or adjusted under 35 U.S.C. 154(b) by 105 days.

(21) Appl. No.: 10/817,710

(22) Filed: Apr. 2, 2004

(65) Prior Publication Data

US 2004/0239108 A1    Dec. 2, 2004

Related U.S. Application Data

(60) Provisional application No. 60/459,848, filed on Apr. 2, 2003.

(51) Int. Cl.
*F16L 7/00*    (2006.01)
(52) U.S. Cl. .............................. 285/123.5; 285/123.1; 285/904; 285/145.5
(58) Field of Classification Search ............. 285/123.1, 285/123.2, 123.5, 123.6, 123.15, 904, 145.5
See application file for complete search history.

(56) References Cited

U.S. PATENT DOCUMENTS

| 311,178 A | 1/1885 | Duffy |
| 1,140,633 A * | 5/1915 | Trucano ............... 285/123.1 |
| 1,481,255 A | 1/1924 | Cumfer |
| 1,786,506 A | 12/1930 | Ray |
| 1,951,677 A | 3/1934 | Rosener |
| 1,993,740 A | 3/1935 | Harris |
| 2,014,355 A | 9/1935 | Hussman |
| 2,185,450 A | 1/1940 | Wager |
| 2,196,766 A | 4/1940 | Hasche |
| 2,337,038 A | 12/1943 | Fentress |
| 2,348,833 A | 5/1944 | Miller |
| 2,732,227 A | 1/1956 | Kaiser |
| 2,937,036 A | 5/1960 | Watkins |
| 3,053,554 A | 9/1962 | Magos et al. |
| 3,068,026 A * | 12/1962 | McKamey ............... 285/123.1 |
| 3,127,200 A | 3/1964 | Sayag |
| 3,137,143 A | 6/1964 | Jacobs et al. |
| 3,207,533 A | 9/1965 | Van Gundy et al. |
| 3,319,979 A | 5/1967 | Herold et al. |
| 3,369,829 A | 2/1968 | Hopkins |
| 3,466,886 A | 9/1969 | Doose et al. |
| 3,469,862 A | 9/1969 | Conibeer |
| 3,488,067 A | 1/1970 | Sommer |

(Continued)

FOREIGN PATENT DOCUMENTS

CA    683468    3/1964

(Continued)

OTHER PUBLICATIONS

Dupont et al., "Ship/Shore Lng Transfer: How To Cut Cost?", First available at GasTech, Nov. 14-17, 2000, Houston, TX; Subsequently published in *LNG Journal* Mar./Apr. 2001.

*Primary Examiner*—David Bochna
(74) *Attorney, Agent, or Firm*—DLA Piper US LLP

(57) ABSTRACT

A fluid piping system and pipe spools are provided. The fluid piping system has at least one pipe spool. The pipe spool has an inner wall and an outer wall with at insulating area defined at least in part by the inner and outer wall. The insulating area of the pipe spool acts to isolate any leak of cryogenic fluid in the pipe spool.

28 Claims, 8 Drawing Sheets

U.S. PATENT DOCUMENTS

| | | | |
|---|---|---|---|
| 3,516,492 A * | 6/1970 | Petersen | 166/343 |
| 3,642,060 A | 2/1972 | Hlinka | |
| 3,725,565 A | 4/1973 | Schmidt | |
| 3,843,171 A * | 10/1974 | Hewlett | 285/98 |
| 3,876,235 A | 4/1975 | Flint | |
| 3,884,511 A | 5/1975 | Hermanson | |
| 3,885,595 A | 5/1975 | Gibson et al. | |
| 3,901,539 A | 8/1975 | Ijzerman | |
| 3,991,588 A | 11/1976 | Laskaris | |
| 4,011,732 A | 3/1977 | Doherty et al. | |
| 4,036,617 A | 7/1977 | Leonard et al. | |
| 4,046,407 A * | 9/1977 | Porreco | 285/123.17 |
| 4,060,263 A | 11/1977 | Kotcharian | |
| 4,099,746 A | 7/1978 | Kontsch et al. | |
| 4,107,946 A | 8/1978 | Potter | |
| 4,108,476 A * | 8/1978 | Krupp | 285/47 |
| 4,134,449 A | 1/1979 | La Haye et al. | |
| 4,165,107 A | 8/1979 | Affa et al. | |
| 4,207,745 A | 6/1980 | Pouillange | |
| 4,246,959 A | 1/1981 | Byrne | |
| 4,332,401 A | 6/1982 | Stephenson et al. | |
| 4,377,552 A | 3/1983 | Doublet et al. | |
| 4,502,714 A | 3/1985 | Brown et al. | |
| 4,515,397 A | 5/1985 | Nowobilski et al. | |
| 4,576,404 A | 3/1986 | Weber | |
| 4,668,303 A | 5/1987 | Weber | |
| 4,685,703 A | 8/1987 | Brock | |
| 4,718,459 A | 1/1988 | Adorjan | |
| 4,826,354 A | 5/1989 | Adorjan | |
| 4,838,581 A | 6/1989 | Oda et al. | |
| 5,090,746 A | 2/1992 | Holzhausen | |
| 5,370,427 A | 12/1994 | Hoelle et al. | |
| 5,378,016 A | 1/1995 | Vollmer et al. | |
| 6,012,292 A | 1/2000 | Gulati et al. | |
| 6,533,334 B1 | 3/2003 | Bonn | |
| 6,623,043 B1 * | 9/2003 | Pollack | 285/121.2 |
| 6,695,358 B1 * | 2/2004 | Bonn | 285/13 |
| 6,866,299 B1 * | 3/2005 | Coates | 285/123.15 |
| 2002/0089177 A1 | 7/2002 | Bonn | |

FOREIGN PATENT DOCUMENTS

| | | |
|---|---|---|
| DE | 315487 | 3/1918 |
| DE | 935224 | 11/1955 |
| DE | 1525477 | 12/1968 |
| DE | 2631566 | 1/1978 |
| DE | 3142702 | 5/1983 |
| DE | 3406607 | 8/1985 |
| DE | 4031879 | 4/1992 |
| FR | 2238109 | 2/1975 |
| GB | 964811 | 7/1964 |
| GB | 1001628 | 8/1965 |
| GB | 1101074 | 1/1968 |
| SU | 752109 | 7/1980 |

* cited by examiner

FLUID PIPING SYSTEMS AND PIPE SPOOLS SUITABLE FOR SUB SEA USE

CROSS REFERENCE TO RELATED APPLICATIONS

This application claims priority to U.S. Provisional App. No. 60/459,848 filed Apr. 2, 2003.

BACKGROUND OF THE INVENTION

The present invention relates to fluid piping systems and pipe spools suitable for a variety of uses, such as sub sea use, underground use, and aboveground use. More particularly, the present invention relates to cryogenic fluid piping systems.

Cryogenic piping systems may be employed to transport liquefied natural gas (LNG) or other cryogenic fluids. It may be desirable to transport such fluids underground or under the sea. However, many cryogenic piping systems may be susceptible to leaks, such as seawater leaks, that may affect the operation of the entire pipeline. For example, a large section of pipeline may need to be replaced in the event of a leak.

Thus, there remains a need in the art for piping systems that are suitable for use in a sub sea environment. Additionally, there remains a need in the art for piping systems that may function in the event of leaks.

SUMMARY OF THE INVENTION

In accordance with an embodiment of the present invention, a fluid piping system is provided. The fluid piping system comprises a plurality of two or more coupled first and second pipe spools. The first pipe spool comprises a downstream end and an upstream end, an inner pipe, and an outer pipe defining an insulating area between the inner pipe and the outer pipe. The insulating area is under vacuum when the first spool is coupled or uncoupled. The first pipe spool also comprises at least one inert gas line disposed between the inner pipe and the outer pipe and running through the insulating area. The second pipe spool comprises a downstream end and an upstream end, an inner pipe, and an outer pipe defining an insulating area between the inner pipe and the outer pipe, wherein the insulating area is under vacuum when the second pipe spool is coupled or uncoupled. The second pipe spool also comprises at least one inert gas line disposed between the inner pipe and the outer pipe and running through the insulating area. The first pipe spool is coupled to the second pipe spool such that an annular space is formed between the first pipe spool and the second pipe spool, and the annular space is disposed such that inert gas may be supplied to the annular space through at least one of the first pipe spool inert gas line or the second pipe spool inert gas line.

In accordance with another embodiment of the present invention, a fluid piping system comprising a plurality of two or more coupled first and second pipe spools is provided. The first pipe spool comprises an inner pipe and an outer pipe defining an insulating area between the inner pipe and the outer pipe, wherein the insulating area is under vacuum when the first spool is coupled or uncoupled. The second pipe spool comprises an inner pipe and an outer pipe defining an insulating area between the inner pipe and the outer pipe, wherein the insulating area is under vacuum when the second pipe spool is coupled or uncoupled. The first pipe spool is coupled to the second pipe spool such that an annular space is formed between the first pipe spool and the second pipe spool.

In accordance with an embodiment of the present invention, fluid piping system comprising a plurality of two or more coupled first and second pipe spools is provided. The first pipe spool comprises a downstream end and an upstream end, an inner pipe, and an outer pipe defining an insulating area between the inner pipe and the outer pipe, wherein the insulating area is under vacuum when the first spool is coupled or uncoupled. The first pipe spool also comprises at least one inert gas line disposed between the inner pipe and the outer pipe and running through the insulating area. The second pipe spool comprises a downstream end and an upstream end, an inner pipe, and an outer pipe defining an insulating area between the inner pipe and the outer pipe, wherein the insulating area is under vacuum when the second pipe spool is coupled or uncoupled. The second pipe spool also comprises at least one inert gas line disposed between the inner pipe and the outer pipe and running through the insulating area. The first pipe spool is coupled to the second pipe spool such that an annular space is formed between the first pipe spool and the second pipe spool. The annular space is disposed such that inert gas may be supplied to the annular space through at least one of the first pipe spool inert gas line or the second pipe spool inert gas line. The annular space is pressurized by the inert gas, and the first pipe spool further comprises a valve disposed at the upstream end of the first pipe spool such that communication may be established between said insulating area and said annular space.

In accordance with another embodiment of the present invention, a pipe spool is provided. The pipe spool comprises a downstream end and an upstream end, an inner pipe, an outer pipe defining an insulating area between the inner pipe and the outer pipe, wherein the insulating area is under vacuum, and at least one inert gas line disposed between the inner pipe and the outer pipe and running through the insulating area.

In accordance with an embodiment of the present invention, a cryogenic fluid delivery system comprised of several pipe spools is provided. At least one spool comprises an inner wall, an outer wall, and an insulating area defined at least in part by said inner wall and said outer wall. The insulating area of said at least one spool acts to isolate any leak of cryogenic fluid in the at least one spool from the other several pipe spools.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS OF THE INVENTION

Figure 1:
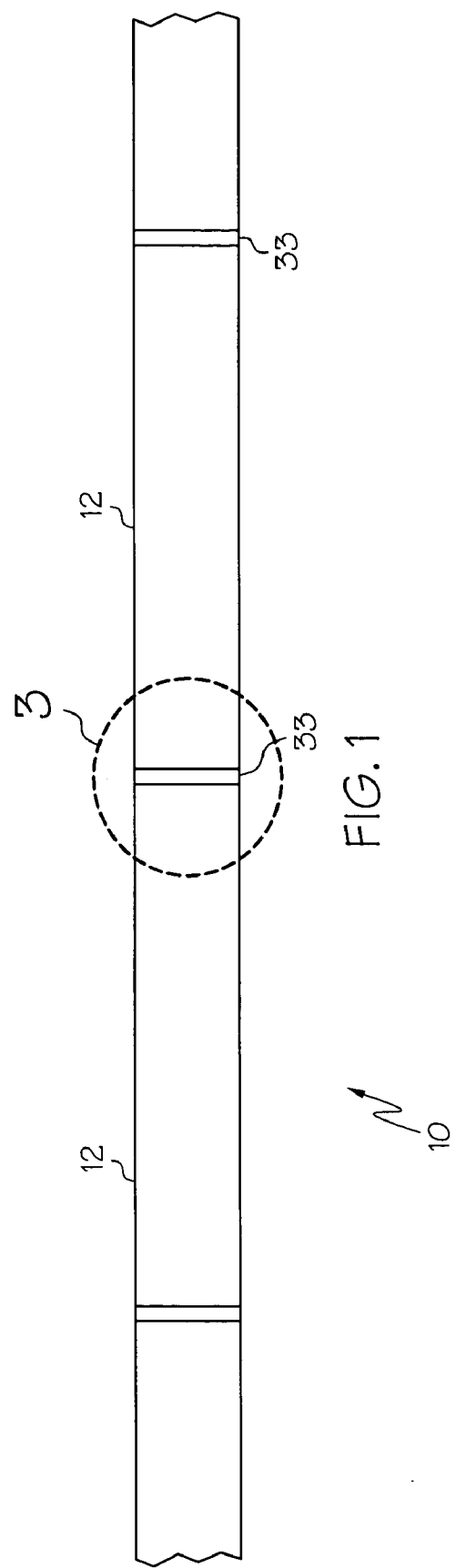
FIG. 1 illustrates a fluid piping system in accordance embodiments of the present invention.
Figure 2:
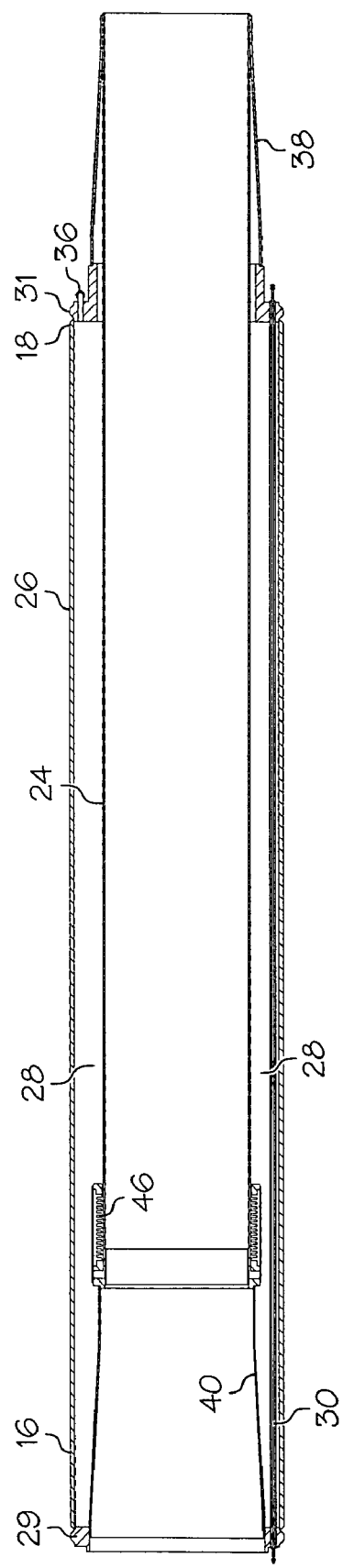
FIG. 2 illustrates a pipe spool in accordance with embodiments of the present invention.

Referring to FIG. 1, a fluid piping system 10 is illustrated. The fluid piping system 10 has a plurality of pipe spools 12. For purposes of defining and describing the present invention, the term "pipe spool" shall be understood as referring to a section of pipe that forms a portion of a pipeline. It will be understood that the pipe spool may have a plurality of inner or outer pipe walls, and it will be understood that a pipeline is generally comprised of two or more pipe spools. A first pipe spool 12 is coupled to a second pipe spool 12. Referring to FIGS. 2 an individual pipe spool 12 is illustrated. The pipe spool 12 has a downstream end 16 and an upstream end 18. The pipe spool 12 has an inner pipe 24 and an outer pipe 26. The outer pipe 26 is disposed such that an insulating area 28 is defined between the inner pipe 24 and the outer pipe 26. The insulating area 28 is under vacuum when the pipe spool 12 is coupled to another pipe spool 12 or when the pipe spool 12 is uncoupled. Thus, the insulating area 28 is under a static vacuum that is present in each pipe spool 12 once the pipe spool is manufactured. Therefore, each pipe spool 12 has a separate vacuum compartment that is compartmentalized from all other pipe spool 12 vacuum compartments. Each pipe spool 12 may be coupled in the field as discussed herein. The insulating area 28 may be formed between the inner pipe 24 and the outer pipe 26 in any suitable manner.

The inner pipe 24 and the outer pipe 26 may be made of any suitable material. For example, the inner pipe 24 and outer pipe 26 could be constructed using 304 Stainless Steel or a 9% nickel pipe. The outer pipe 26 may also be constructed from materials suitable for the environment in which it will be installed. For example, the outer pipe 26 could be constructed from materials resistant to corrosion in seawater. The inner and outer pipes 24, 26 may have any suitable diameter. For example, the inner pipe 24 could have a diameter between about 16 to about 26 inches. The outer pipe 26 could have a diameter between about 28 to about 38 inches. The inner and outer pipes 24, 26 may have any suitable wall thickness. Additionally, the inner pipe 24 could have insulation (not shown) provided thereon. The pipe spool 12 may be provided in any suitable length. For example, the pipe spool 12 could be, but is not limited to, about 22 to about 26 meters in length.

The pipe spool 12 has at least one inert gas line 30 disposed between the inner pipe 24 and the outer pipe 26. The inert gas line 30 runs generally parallel to the inner pipe 24, and the inert gas line 30 runs generally through the insulating area 28. The inert gas line 30 may be secured to a flange 29 at the downstream end 16 of the pipe spool 12. Additionally, the inert gas line may be secured to a flange 31 at the upstream end 18 of the pipe spool 12. Any other suitable securing method or configuration may be used. Any suitable number of inert gas lines 30 may be provided. For example, one, two, three or more inert gas lines 30 may be provided. Each pipe spool 12 has means provided to allow the pipe spool 12 to be coupled to another pipe spool 12. Any suitable means may be used. For example, the pipe spool 12 may have a male bayonet 38 and a female bayonet 40 as pictured. Additionally, the pipe spool 12 may have a coupling flange 29 at the first end 16 and a coupling flange 31 at the second end 18. It will be understood that the pipe spool 12 could have other coupling means at the downstream end 16 or the upstream end 18 depending on the particular needs of the application. For example, the pipe spool 12 could have a male bayonet 38 at one end with a female bayonet 40 or standoff ring closure (not pictured) at the opposite end.

Figure 3:
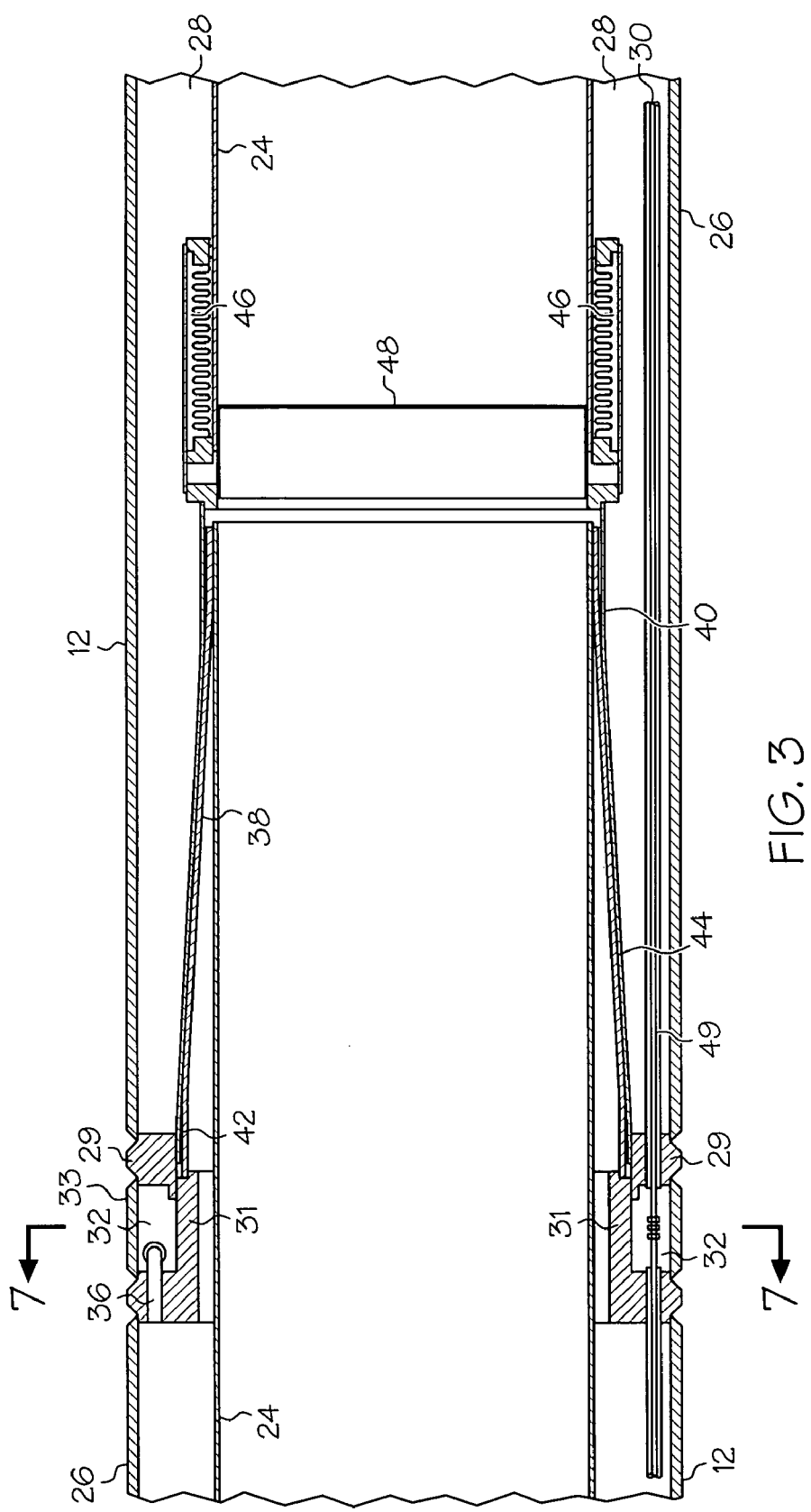
FIG. 3 is a sectional view of a portion of FIG. 1.
Figure 4:
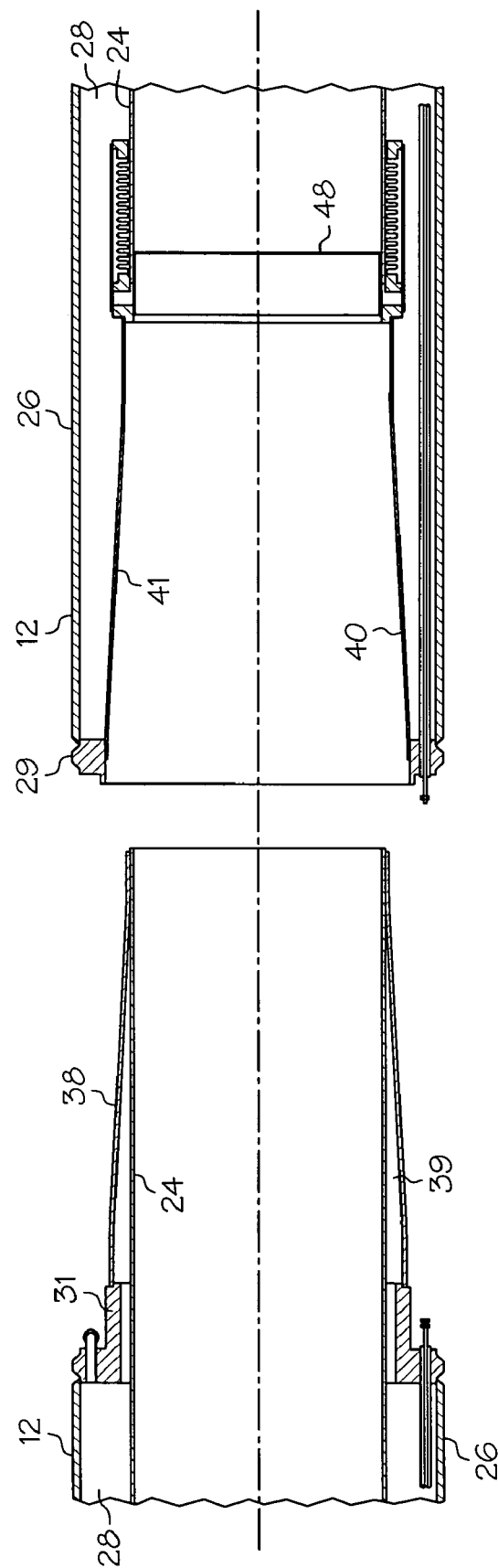
FIG. 4 illustrates sectional portions of uncoupled pipe spools in accordance with embodiments of the present invention.

Referring now to FIGS. 1, 3 and 4, the connection of the pipe spools 12 will now be discussed. Generally, one end 18 of a pipe spool 12 is inserted into another end 16 of another pipe spool. For example, the male bayonet 38 may be inserted into the female bayonet 40. The male bayonet 38 may comprise a mating area 39 having a mating surface 42 disposed around the inner pipe 24. The female bayonet 40 may comprise a mating area 41 having a mating surface 44 disposed at an end of the inner pipe 24. The mating surfaces 42, 44 are shown as having a frusto-conical shape. However, the mating surfaces 42, 44 may have any suitable shape such as a conical shape. As shown in FIGS. 3 and 4, the female bayonet 40 may have an expansion-contraction bellows 46 disposed at least partially around the inner pipe 24. The expansion-contraction bellows 46 allows thermal contraction or expansion of the inner pipe 24. Suitable bellows designs may be found in U.S. Pat. Nos. 6,533,334 and 6,695,358, which are incorporated by reference herein. Additionally, the female bayonet 40 may have an inner flange 48 secured to the inner pipe 46, and the bellows 46 may be secured to the inner flange 48 in any suitable manner.

The male bayonet 38 is inserted into the female bayonet 40 such that the mating surfaces 42 and 44 of the bayonets 38, 40 touch as shown in FIG. 3 and form a cryogenic seal. For purposes of defining and describing the present invention, the term "cryogenic seal" shall be understood as a seal past which cryogenic fluids may flow without significant leakage through the seal. It will be understood by those having skill in the art that any suitable cryogenic mating arrangement may be used in the present invention so long as a cryogenic seal is formed between the inner pipes 24 of the spools 12. For example, the male bayonet 38 could have an expansion-contraction bellows provided thereon instead of or in addition to the expansion-contraction bellows 46 pictured.

Figure 5:
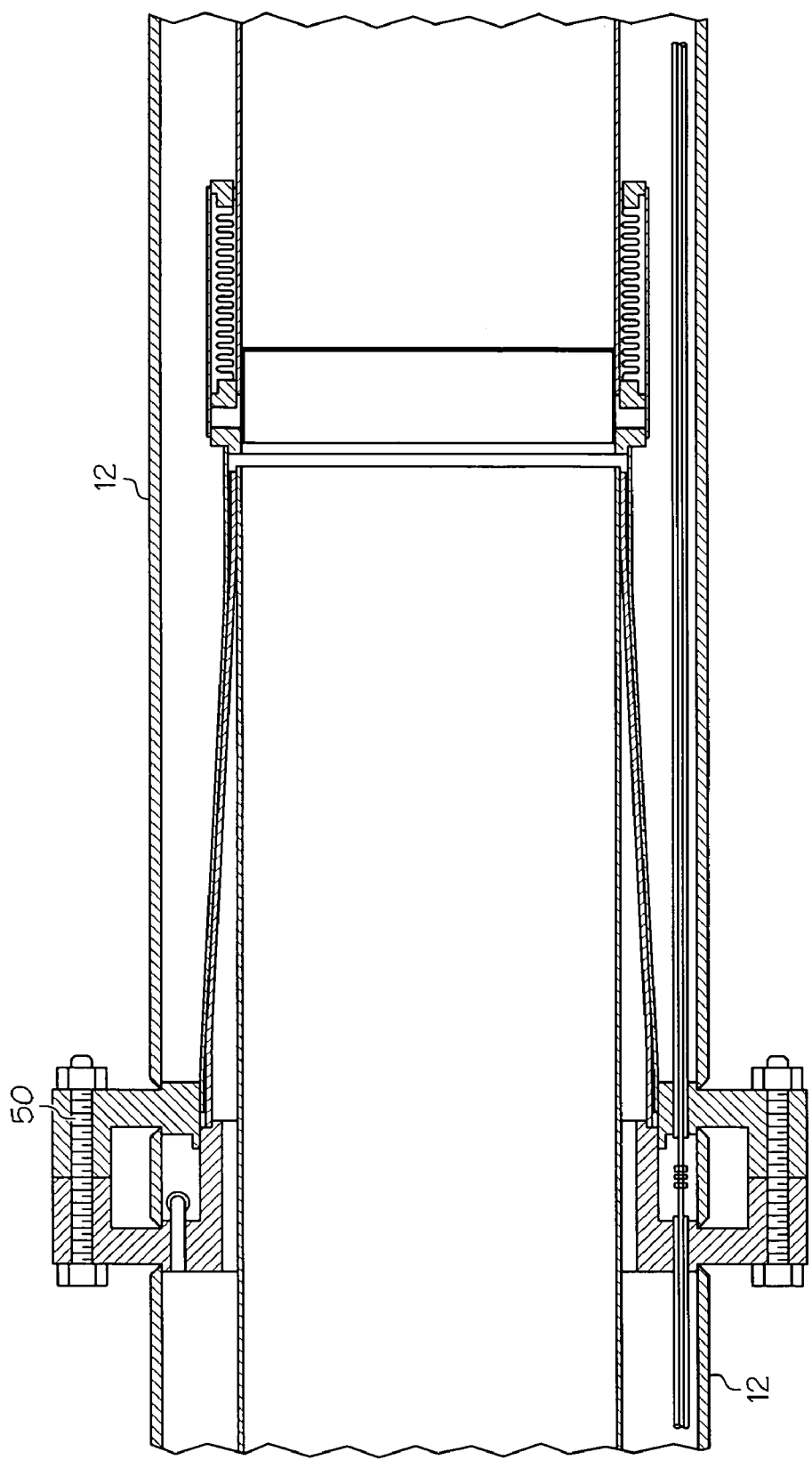
FIG. 5 illustrates an alternative coupling means in accordance with embodiments of the present invention.
Figure 6:
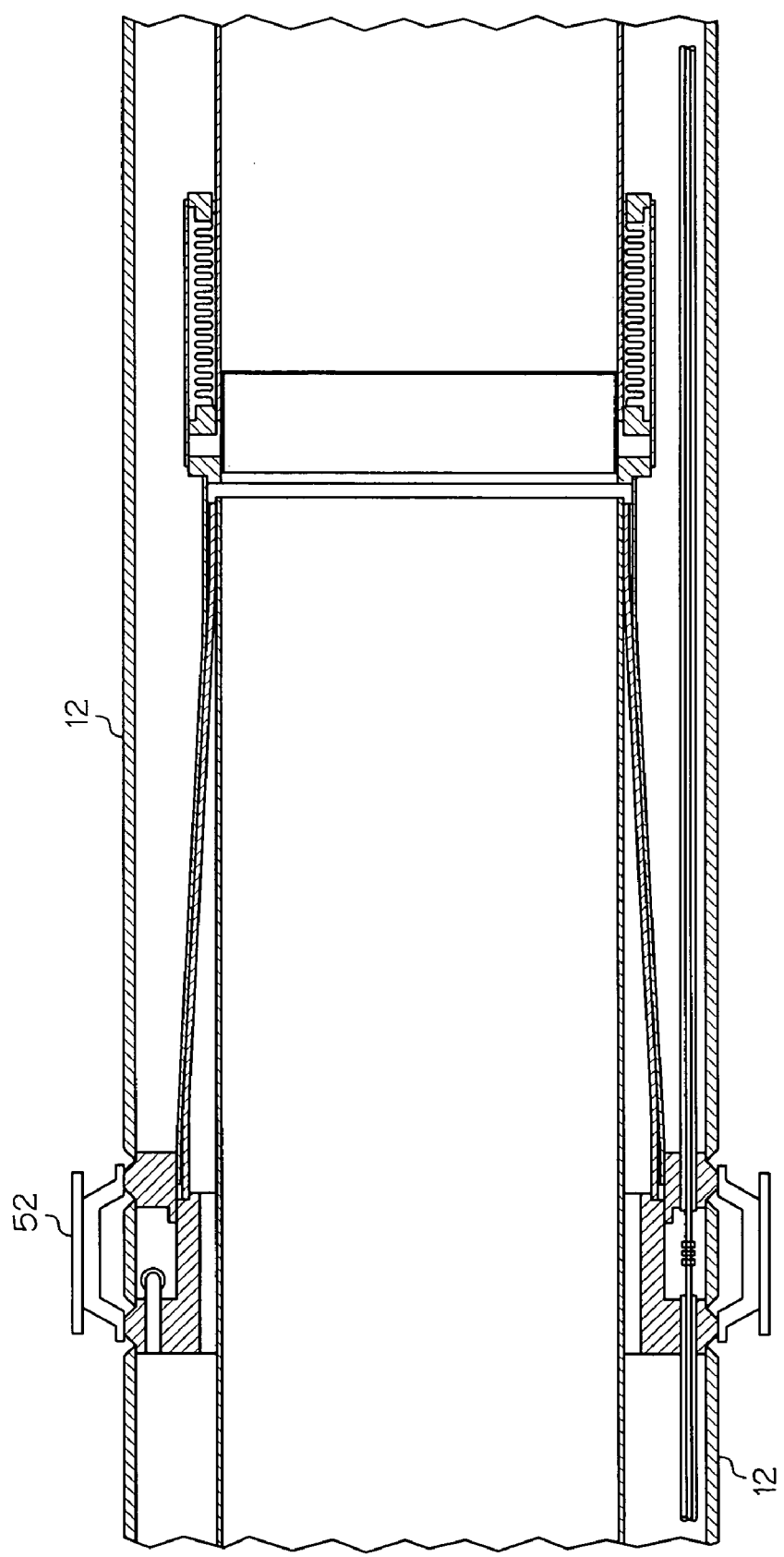
FIG. 6 illustrates another alternative coupling means in accordance with embodiments of the present invention.

Once the male bayonet 38 has been inserted into the female bayonet 40, the pipe spools 12 may be permanently coupled. For example as shown in FIG. 3, the coupling flanges 29 and 31 may be butted together and welded to form a butt welded construction. Alternatively, as shown in FIGS. 5 and 6, the pipe spools 12 may have a bolt and threaded flange connection 50 or a standoff ring closure with a ring clamp 52. It will be understood that a welded connection such as the one shown in FIG. 3 may be desirable for sub sea applications because there are no protrusions on the outside of the pipe spool 12. Thus, the entire pipeline could be pulled from shore or installed with a lay barge. Additionally, a uniform coating of concrete over the pipe spools 12 may be provided easily because there are no protrusions.

As shown in FIG. 3, the pipe spools 12 are coupled together such that an annular space 32 is formed between the spools 12. The annular space 32 between the pipe spools 12 may be formed in any suitable manner. For example, the annular space 32 may be formed between the coupling flanges 29, 31, when the male bayonet 38 is inserted into the female bayonet 40. As shown in FIG. 3, the annular space 32 may have a cover 33 that covers the annular space 32. The cover 33 is removable and may be welded in place when the pipe spools 12 are connected. The annular space 28 is disposed such that inert gas may be supplied to the annular space 28 through at least one of the inert gas lines 30. Thus, it will be understood that the annular space 28 may be pressurized with an inert gas, such as nitrogen, when the pipe spools 12 are coupled as shown in FIG. 3. One or more of the inert gas lines 30 may have a remote temperature measurement device 49 contained therein, and temperature measurements of the pipe spool 12 at any desired location or locations may be obtained remotely. For example, the remote temperature measurement device 49 may be a fiber optic temperature measurement system.

Figure 7:
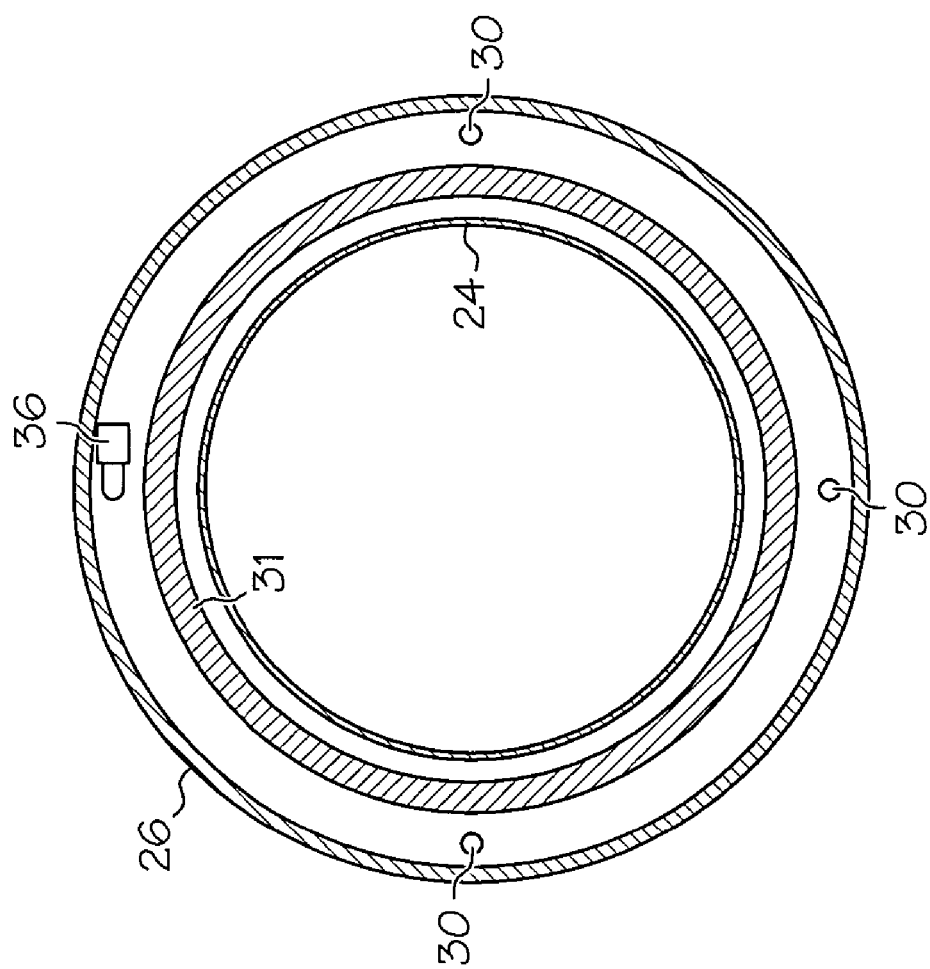
FIG. 7 illustrates a cross section of FIG. 3.

Referring now to FIGS. 2, 3, and 7, the pipe spools 12 may have a valve 36 disposed at the upstream end of the pipe spool 12. The valve 36 is provided such that communication may be established between the insulating area 28 and the annular space 32 when the valve 36 is operated as appropriate and as described below. The valve 36 is generally in a closed position, and the operation of the valve 36 will be discussed further herein. Referring specifically to FIG. 7, three inert gas lines 30 are shown with one valve 36. It will be apparent to those having skill in the art that the exact position of the lines 30 or the valve 36 through the coupling flange 31 will not affect the operation of the pipe spools 12. Additionally, it will be apparent that three inert gas lines 30, fewer lines, or more lines may be provided.

Referring now to FIGS. 1, 2, 3, 7, the operation of the fluid piping system 10 will now be discussed. Once the pipe spools 12 have been coupled, the internal pipe 24 may be utilized to transport cryogenic liquids such as liquid natural gas. Thus, the internal pipe 24 may comprise a fluid carrying pipe. The internal pipe 24 is insulated by the vacuum contained in the insulating area 28. Thus, the outer pipe 26 in FIGS. 2, 3, and 7 comprises a vacuum jacket and a carrier pipe. By carrier pipe it is meant the pipe that is exposed to the ambient atmosphere.

During the operation of the fluid piping system 10, cryogenic liquid will flow through the inner pipe 24. Additionally, an inert gas, such as nitrogen, will be provided along the fluid piping system 10 through the inert gas lines 30. Each of the valves 36 generally remain closed throughout the operation of fluid piping system 10. Thus, the annular spaces 32 are under inert gas pressure during normal operation. The amount of pressurization of the annular spaces 32 may be controlled by controlling the flow of inert gas through the inert gas lines. Each insulating space 28 of the spools 12 is under a static vacuum, and the vacuum is compartmentalized from spool to spool 12 as discussed above.

The fluid piping system 10 may be utilized for sub-sea applications, underground applications, or aboveground applications, and the fluid piping system 10 functions to compartmentalize each pipe spool 12 from adjacent spools in the event of a failure. If seawater enters the insulating space 28 of one of the pipe spools 12 from damage to the outer pipe 26, the leak will be contained in only the affected pipe spool 12. The valve 36 is closed during normal operation, and, if a seawater leak occurs, the valve 36 will remain closed because the head pressure of the seawater is lower than the back pressure on the valve from the nitrogen pressurization in the annular space 32. Thus, the leak is contained to one pipe spool section 12 and the leak is not transmitted through the inert gas lines 30. If a seawater leak occurs, the remote temperature measurement device 49 may be used to detect the increased heat leak from the water freezing in the affected insulating area 28. Generally, the affected spool section 12 would need to be replaced because the inner pipe 24 may be corroded by seawater. However, the fluid piping system would still function until the affected pipe spool 12 could be replaced.

In the event of a leak of cryogenic liquid from the inner pipe 24 into the insulating space 28, the leak would not be transmitted to adjacent pipe spools 12 because the insulating space 28 is compartmentalized. The leak of the cryogenic liquid would cause cooling of the surroundings of the affected pipe spool 12. For example, if the liquid piping system were buried under the sea floor, the ground around the affected pipe spool would freeze, and this temperature change would be apparent from the remote temperature measurement device 49. The fluid piping system 10 could function with this leak, and the affected spool 12 could be replaced as needed during regular maintenance. The valve 36 would only open if the inner pipe 24 is in danger of collapsing. The valve 36 would open if the pressure of the cryogenic liquid were greater than the back pressure of the inert gas on the valve 36. If the valve 36 did open when the leak occurred, the pressure could stabilize, and the valve 36 could be closed by increasing the nitrogen pressure.

In the event of a leak of the inert gas from the inert gas lines 30 into the insulating space 28, the leak is contained in the affected pipe spool 12 because the insulating space 28 is compartmentalized from adjacent insulating spaces 28. This type of leak could cause increased heat leak in the affected pipe spool 12 and the outer pipe 26 could be cooled by this leak. This leak is unlikely to affect the operation of the liquid piping system 10.

Figure 8:
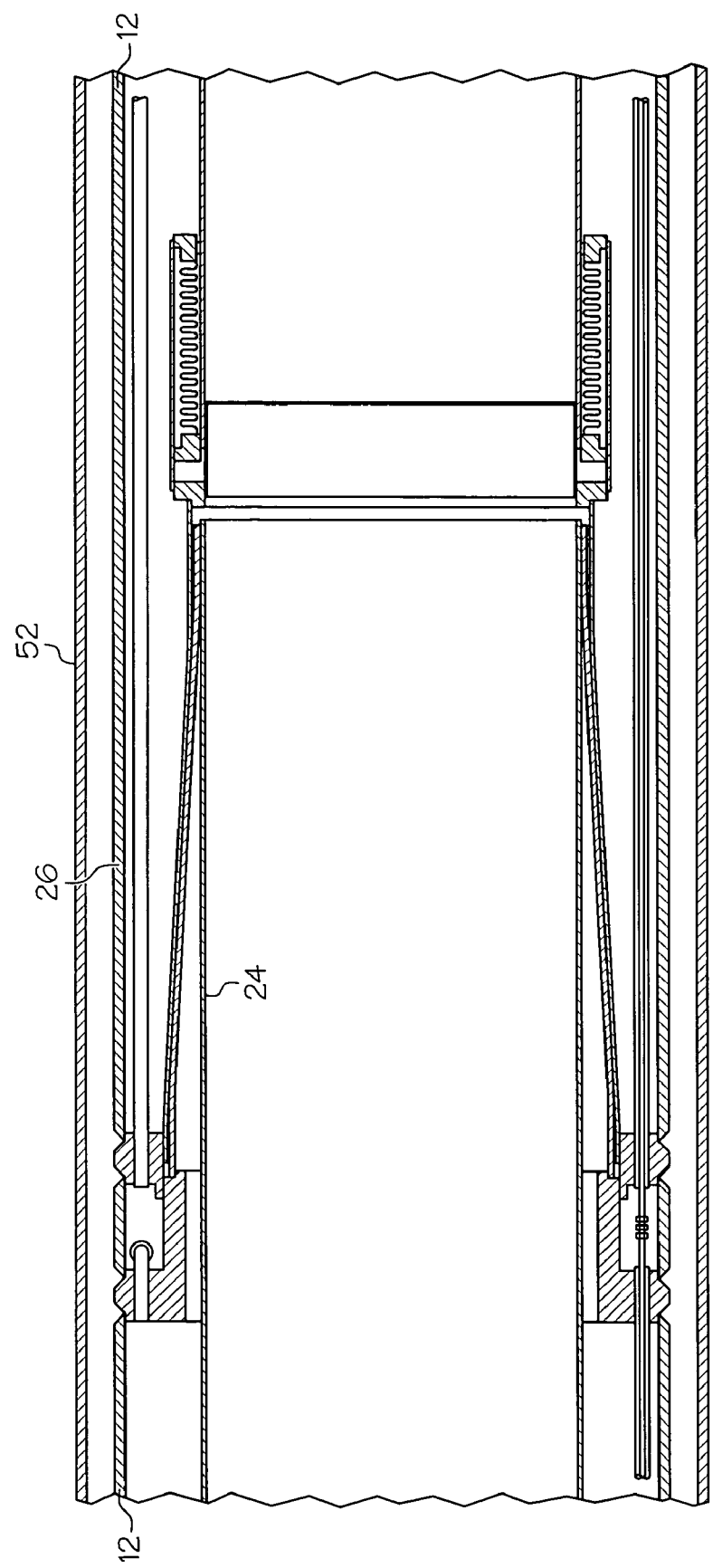
FIG. 8 illustrates coupled pipe spools in accordance with embodiments of the present invention.

In an embodiment of the invention, the outer pipe 26 may have a carrier pipe 52 disposed around at least a portion of the outer pipe 26 as illustrated in FIG. 8. In the configuration of FIG. 8, the outer pipe 26 acts as a vacuum jacket. However, this configuration may require some insulation (not shown) between the outer pipe 26 and the carrier pipe 52 in order to keep the carrier pipe 52 from becoming too cold in the event of a fluid leak into the insulating area 28. The fluid piping system 10 having a carrier pipe 52 would function similarly to the system without a carrier jacket 52 as described above in the event of a leak. However, replacement of spool sections 12 could be more difficult if the carrier pipe 52 covered more than one spool section 12. Additionally, if seawater were to leak into the space between the carrier pipe 52 and the outer pipe 26 any insulation could be destroyed, and the affected spool 12 or spools 12 would need to be replaced.

The pipe spools and the liquid piping systems of the present invention may be used to transport any suitable cryogenic liquid through any suitable environment. For example, the pipe spool systems could be used above ground or in sub sea applications. Additionally, it will be understood that the liquid piping systems may be used in conjunction with any other suitable systems such as pumping and monitoring systems in order to form a pipeline.

It will be obvious to those skilled in the art that various changes may be made without departing from the scope of the invention, which is not to be considered limited to what is described in the specification.

What is claimed is:

1. A fluid piping system, comprising a plurality of two or more coupled first and second pipe spools, wherein:
   said first pipe spool comprises:
   a downstream end and an upstream end;
   an inner pipe;
   an outer pipe defining an insulating area between said inner pipe and said outer pipe, wherein said insulating area is under vacuum when said first spool is coupled or uncoupled; and at least one inert gas line disposed between said inner pipe and said outer pipe and running through said insulating area;

said second pipe spool comprises:
  a downstream end and an upstream end;
  an inner pipe;
  an outer pipe defining an insulating area between said inner pipe and said outer pipe, wherein said insulating area is under vacuum when said second pipe spool is coupled or uncoupled; and
  at least one inert gas line disposed between said inner pipe and said outer pipe and running through said insulating area;

said first pipe spool is coupled to said second pipe spool such that an annular space is formed between said first pipe spool and said second pipe spool;

said annular space is disposed such that inert gas may be supplied to said annular space through at least one of said first pipe spool inert gas line or said second pipe spool inert gas line; and said first pipe spool further including a valve disposed at said upstream end of said first pipe spool such that communication may be established between said insulating area and said annular space.

2. The system as claimed in claim 1 wherein said valve is closed.

3. The system as claimed in claim 1 wherein said communication between said insulating area and said annular space may be established when said valve is open.

4. The system as claimed in claim 1 wherein pressure from water that may leak into said insulating space of said first spool does not cause said valve to open because pressure on said valve from inert gas provided to said annular space through said at least one inert gas line is greater than said pressure from said water.

5. The system as claimed in claim 1 wherein said system comprises a plurality of coupled pipe spools.

6. The system as claimed in claim 1 wherein a leak that occurs in said insulating area of said first pipe spool is not transmitted to said second pipe spool.

7. The system as claimed in claim 6 wherein said leak comprises a leak from fluid in said inner pipe of said first pipe spool.

8. The system as claimed in claim 6 wherein said leak comprises a leak from water outside of said outer pipe of said first pipe spool.

9. The system as claimed in claim 6 wherein said leak comprises inert gas from said inert gas line in said first pipe spool.

10. The system as claimed in claim 1 wherein a leak that occurs in said insulating area of said second pipe spool is not transmitted to said first pipe spool.

11. The system as claimed in claim 10 wherein said leak comprises a leak from fluid in said inner pipe of said second pipe spool.

12. The system as claimed in claim 10 wherein said leak comprises a leak from water outside of said outer pipe of said second pipe spool.

13. The system as claimed in claim 10 wherein said leak comprises inert gas from said inert gas line in said second pipe spool.

14. The system as claimed in claim 1 wherein said insulating area of said first pipe spool is compartmentalized from said insulating area of said second pipe spool.

15. The system as claimed in claim 1 wherein one of said first pipe spool at least one inert gas line further comprises a remote temperature measurement system.

16. The system as claimed in claim 1 wherein one of said second pipe spool at least one inert gas line further comprises a remote temperature measurement system.

17. The system as claimed in claim 1 wherein said first pipe spool comprises a coupling flange at said upstream end, and wherein said second pipe spool comprises a coupling flange at said downstream end.

18. The system as claimed in claim 17 wherein said first pipe spool coupling flange and said second pipe spool coupling flange define at least a portion of said annular space.

19. The system as claimed in claim 1 wherein said annular space is pressurized.

20. The system as claimed in claim 1 wherein said upstream end of said first pipe spool comprises a male bayonet.

21. The system as claimed in claim 20 wherein said downstream end of said first pipe spool comprises a female bayonet.

22. The system as claimed in claim 20 wherein said downstream end of said second pipe spool comprises a female bayonet, and wherein said male bayonet is inserted into said female bayonet to form a cryogenic seal.

23. The system as claimed in claim 22 wherein said female bayonet further comprises an expansion contraction bellows.

24. The system as claimed in claim 22 wherein said male bayonet further comprises an expansion contraction bellows.

25. The system as claimed in claim 22 wherein said upstream end of said second pipe spool comprises a male bayonet.

26. The system as claimed in claim 1 wherein said first pipe spool further comprises a carrier pipe disposed around at least a portion of said outer pipe, and wherein said outer pipe comprises a vacuum jacket.

27. The system as claimed in claim 1 wherein said second spool farther comprises a carrier pipe disposed around at least a portion of said outer pipe, and wherein said outer pipe comprises a vacuum jacket.

28. A fluid piping system, comprising a plurality of two or more coupled first and second pipe spools, wherein;
  said first pipe spool comprises:
    a downstream end and an upstream end;
    an inner pipe;
    an outer pipe defining an insulating area between said inner pipe and said outer pipe, wherein said insulating area is under vacuum when said first spool is coupled or uncoupled; and
    at least one inert gas line disposed between said inner pipe and said outer pipe and running through said insulating area;
  said second pipe spool comprises:
    a downstream end and an upstream end;
    an inner pipe;
    an outer pipe defining an insulating area between said inner pipe and said outer pipe, wherein said insulating area is under vacuum when said second pipe spool is coupled or uncoupled; and
    at least one inert gas line disposed between said inner pipe and said outer pipe and running through said insulating area;

said first pipe spool is coupled to said second pipe spool such that an annular space is formed between said first pipe spool and said second pipe spool;

said annular space is disposed such that inert gas may be supplied to said annular space through at least one of said first pipe spool inert gas line or said second pipe spool inert gas line;

said annular space is pressurized by said inert gas; and said first pipe spool further comprises a valve disposed at said upstream end of said first pipe spool such that communication may be established between said insulating area and said annular space.

* * * * *